(12) United States Patent
Johnson et al.

(10) Patent No.: US 8,535,414 B2
(45) Date of Patent: Sep. 17, 2013

(54) RECOVERING OF XENON BY ADSORPTION PROCESS

(75) Inventors: Andrew David Johnson, Doylestown, PA (US); Richard Vincent Pearce, Kempton, PA (US); Thomas Stephen Farris, Bethlehem, PA (US); Timothy Christopher Golden, Allentown, PA (US); Matthew John Bosco, Breinigsville, PA (US); Eugene Joseph Karwacki, Jr., Orefield, PA (US); David Charles Winchester, Walnutport, PA (US); Jeffrey Raymond Hufton, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 169 days.

(21) Appl. No.: 13/236,112

(22) Filed: Sep. 19, 2011

(65) Prior Publication Data

US 2012/0079939 A1    Apr. 5, 2012

Related U.S. Application Data

(60) Provisional application No. 61/388,279, filed on Sep. 30, 2010.

(51) Int. Cl.
*B01D 53/047* (2006.01)
*C01B 23/00* (2006.01)

(52) U.S. Cl.
USPC .................. 95/95; 95/97; 95/103; 95/127

(58) Field of Classification Search
USPC ................. 95/95–97, 103, 104, 127
See application file for complete search history.

(56) References Cited

U.S. PATENT DOCUMENTS

| | | | |
|---|---|---|---|
| 4,054,427 A * | 10/1977 | Schroeter et al. | ............... 95/97 |
| 5,084,075 A | 1/1992 | Sircar | |
| 6,217,633 B1 | 4/2001 | Ohmi et al. | |
| 6,236,041 B1 | 5/2001 | Donnerhack et al. | |
| 6,408,849 B1 | 6/2002 | Spiegelman et al. | |
| 6,605,136 B1 | 8/2003 | Graham et al. | |
| 7,285,154 B2 | 10/2007 | Karwacki, Jr. et al. | |
| 7,442,236 B2 | 10/2008 | Taveira et al. | |

(Continued)

FOREIGN PATENT DOCUMENTS

| | | |
|---|---|---|
| DE | 196 46 791 A1 | 5/1998 |
| EP | 1 495 793 A1 | 1/2005 |

(Continued)

OTHER PUBLICATIONS

Pokonova, Y.; "Carbon Adsorbents from Petroleum Pitch"; Chemistry and Technology of Fuels and Oils; vol. 37, No. 3; 2001; pp. 206-211.

*Primary Examiner* — Frank Lawrence, Jr.
(74) *Attorney, Agent, or Firm* — Lina Yang (57) ABSTRACT

The present invention discloses the improvements to a vacuum swing adsorption (VSA) process used for Xe recovery. By only collecting the recovered gas mixture after the initial evacuation of $N_2$ from the adsorbent vessel and void space, the recovered Xe is not diluted by $N_2$ contained in the adsorbent vessel and void space. The concentration of the recovered Xe can by increased (high purity), simultaneously little Xenon is lost. During the initial evacuation of $N_2$, the vessel has been evacuated to a pressure less than 1 atmospheric pressure, for example, from 100 to 1 torr.

18 Claims, 10 Drawing Sheets

(56) References Cited

U.S. PATENT DOCUMENTS

| | | | |
|---|---|---|---|
| 7,594,955 B2 * | 9/2009 | Ishihara | 95/95 |
| 2005/0199122 A1 | 9/2005 | Urakami et al. | |
| 2006/0107831 A1 | 5/2006 | Karwacki, Jr. et al. | |
| 2007/0273850 A1 | 11/2007 | Brewster | |
| 2009/0107331 A1 | 4/2009 | Urakami | |
| 2009/0126733 A1 | 5/2009 | Kulkarni et al. | |
| 2010/0098491 A1 | 4/2010 | Monereu et al. | |
| 2013/0019749 A1 * | 1/2013 | Hufton et al. | 95/95 |

FOREIGN PATENT DOCUMENTS

| | | |
|---|---|---|
| JP | 04-227812 | 8/1992 |
| JP | 2004-000819 | 1/2004 |
| JP | 2004-058056 | 2/2004 |
| JP | 2007-130611 | 5/2007 |
| RU | 115597 | 7/1999 |
| RU | 122631 | 8/2000 |
| WO | 2007/055035 A1 | 5/2007 |

* cited by examiner

RECOVERING OF XENON BY ADSORPTION PROCESS

CROSS-REFERENCE TO RELATED APPLICATIONS

This invention claims the benefit of U.S. Provisional Application 61/388,279, filed Sep. 30, 2010. The disclosure of this provisional application is hereby incorporated by reference.

BACKGROUND OF THE INVENTION

Xenon (Xe) is a noble-gas element that is extremely stable due to its closed-shell electronic structure. Indeed, this lack of reactivity is why this group of elements (He, Ne, Ar, Kr, Xe) are called noble or inert. The first Xe compounds (e.g., $XeF_2$) were identified less than 50 years ago. Although the chemistry of this element is limited, its physical properties (e.g., ionization potential, atomic mass, electronic structure) have resulted in an increasing number of applications requiring xenon.

Demand for xenon is growing based on emerging applications in the manufacturing and healthcare industries.

Xenon is a byproduct and a slowdown of industrial production can lead to xenon shortages even as its usage increases.

Xenon is also a byproduct from etching processes that employ XeF2. This molecule decomposes on the surfaces of materials such as silicon to release atomic fluorine. The xenon then departs from the surface back into the gas phase.

Adding xenon to fluorocarbon (e.g., $C_4F_6$) plasmas used to etch silicon oxide during semiconductor manufacturing improves the anisotropy of the etch profile. Xenon additions also improve etch selectivity; i.e., the etch rate of silicon oxide is much higher than photoresist used to pattern the silicon oxide film.

Xenon also finds increasing use in the healthcare industry as an anesthetic gas, as described in U.S. Pat. No. 6,236,041, and in medical imaging as described in U.S. Pat. No. 6,408,849. Other applications include Ion Propulsion Engines (Aerospace), Flat Panel Displays (Plasma), and High Intensity Discharge (HID) Lighting.

However, a potential barrier to increased xenon utilization is the relatively high cost of xenon. Xenon is a trace component of the atmosphere (87 ppb) obtained by air separation; i.e., 11 million L of air is needed to obtain 1 L of Xenon. Consequently, Xenon is thus a high value material. Additionally, Xenon pricing is quite variable since its supply is controlled by air separation units (ASUs) supporting underlying industries, such as steel.

In U.S. Pat. No. 7,285,154, which is incorporated herein by reference in its entirety, a method has been developed for recovering xenon from gas mixtures, such as manufacturing effluent gases, using an adsorption-based process. However, the process only recovers Xenon from a nitrogen-rich, xenon-containing feed gas that is dilute in xenon (0.5% to 5.0% xenon), the final concentration is about 15 times its initial concentration.

Despite the foregoing developments, it is still desired to provide additional and improved means to recover Xenon from gaseous mixtures. And, there is a need for recovering unutilized Xe from Xe-based process with a high concentration of Xe.

BRIEF SUMMARY OF THE INVENTION

Accordingly, the present invention is directed to the use of an improved vacuum swing adsorption (VSA) process to increase the Xenon concentration in the recovery process.

A process of recovering xenon from a Xe-containing feed gas, comprises the steps of:
providing an adsorption vessel containing an adsorbent having a $Xe/N_2$ selectivity ratio of less than 65;
feeding the Xe-containing feed gas into the adsorption vessel, wherein the Xe-containing feed gas comprises an initial concentration of nitrogen greater than 50% and an initial concentration of xenon of at least 0.05%;
evacuating the adsorption vessel by reducing pressure from atmospheric pressure to below atmospheric pressure, wherein the evacuating contains two parts: (1) evacuating a first part of gas, and (2) recovering a first xenon-enriched gas when the below atmospheric pressure reaches P1;
purging the adsorption vessel when the below atmospheric pressure reaching P2 to recover a second xenon-enriched gas, wherein the purging is maintained at the subatmospheric pressure P2; and
combining the first xenon-enriched gas and the second xenon-enriched gas to provide a product gas comprising a final concentration of xenon at least 20 times greater than the initial concentration of xenon;
wherein P1 is equal to or greater than P2.

The evacuating of the first part of gas can be venting the first part of gas, or recycling the first part of gas into the feeding step.

Yet, another process of recovering xenon from a Xe-containing feed gas, comprises the steps of:
providing an adsorption vessel containing an adsorbent having a $Xe/N_2$ selectivity ratio of less than 65;
feeding the Xe-containing feed gas into the adsorption vessel, wherein the Xe-containing feed gas comprises an initial concentration of nitrogen greater than 50% and an initial concentration of xenon of at least 0.05%;
evacuating the adsorption vessel by reducing pressure from atmospheric pressure to below atmospheric pressure, wherein the evacuating contains two parts: (1) recycling a first part of gas into the feeding step, and (2) recovering a first xenon-enriched gas when the below atmospheric pressure reaches P1;
purging the adsorption vessel when the below atmospheric pressure reaching P2 to recover a second xenon-enriched gas, wherein the purging is maintained at the subatmospheric pressure P2; and
combining the first xenon-enriched gas and the second xenon-enriched gas to provide a product gas comprising a final concentration of xenon at least 20 times greater than the initial concentration of xenon;
wherein P1 is equal to or greater than P2.

Further provided is a xenon recovery apparatus adapted to perform the process of recovering xenon from a Xe-containing feed gas, said apparatus comprising:
an adsorption vessel containing an adsorbent having a $Xe/N_2$ selectivity ratio of less than 65;
an adsorption vessel containing an adsorbent having a $Xe/N_2$ selectivity ratio of less than 65;
a pump adapted to evacuate the adsorption vessel;
a compressor adapted to compress the xenon-enriched gases;
a product vessel to contain the compressed xenon-enriched gases; and
a collecting system to collect the first part of gas to the adsorption vessel.

The collecting system is selected from the group of a venting system to vent the first part of gas, and a feeding system to feed the first part of gas to the adsorption vessel.

DETAILED DESCRIPTION OF THE INVENTION

This invention provides means for recovering xenon from gas mixtures, such as manufacturing effluent gases, using an adsorption-based process.

The preferred process of the invention is for the recovery of xenon from a nitrogen-rich, Xenon-containing feed gas. The source of the feed gas is not particularly limited. In certain embodiments, the feed gas is an effluent gas from a semiconductor related manufacturing process, such as etching, or Extended Ultra-Violet (EUV) lithography, or Plasma Enhanced-CVD. In other embodiments, the feed gas can derive from a purchased source. In still other embodiments, the feed gas is exhaled respiratory gases from an anesthetized patient.

The feed gas comprises Xe and at least one member selected from the group consisting of HF, $F_2$, $H_2O$, $C_4F_6$, $O_2$, $CO_2$, $COF_2$, $XeF_2$, $CF_4$ and $SiF_4$, is passed through a surge vessel to adsorb at least one of $H_2O$, $CO_2$, and fluorinated molecules from the effluent gas, and is diluted with $N_2$ to provide the feed gas for feeding into the adsorption apparatus.

The feed gas is preferably dilute in xenon (0.1% to 5.0% xenon, or 0.5% to 1.5% xenon, or 1.0% to 2.5% xenon). Nitrogen can be added to the feed gas if the feed gas, as obtained from the feed gas source, contains an insufficient amount of nitrogen.

The feed gas fed to the adsorption vessel has a preferred temperature range of 0° C. to 100° C., more preferably 0° C. to 50° C., and even more preferably 10° C. to 30° C. The feed gas fed to the adsorption vessel preferably has a pressure range of 1 to 2 atmospheric pressure.

The Xe recovery rate is preferably at least 80%, or at least 85%, or at least 90%. As used herein, the expression "Xe recovery rate" is defined as the amount of Xe recovered from the process divided by the amount of Xe fed into the adsorbent vessel. The Xe recovery rate can be determined through the use of mass spectrometry or gas chromatography.

The Xe concentration factor in the current invention is >20. The Xe concentration factor is defined as the concentration of Xe in the recovered stream divided by the concentration of Xe in the feed stream. For example, the Xe concentration factor is 29 where a final concentration of xenon in the product is 29 times greater than the initial concentration of xenon in the feed gas. The Xe concentration factor can be determined by mass spectrometry or gas chromatography.

Figure 1A:
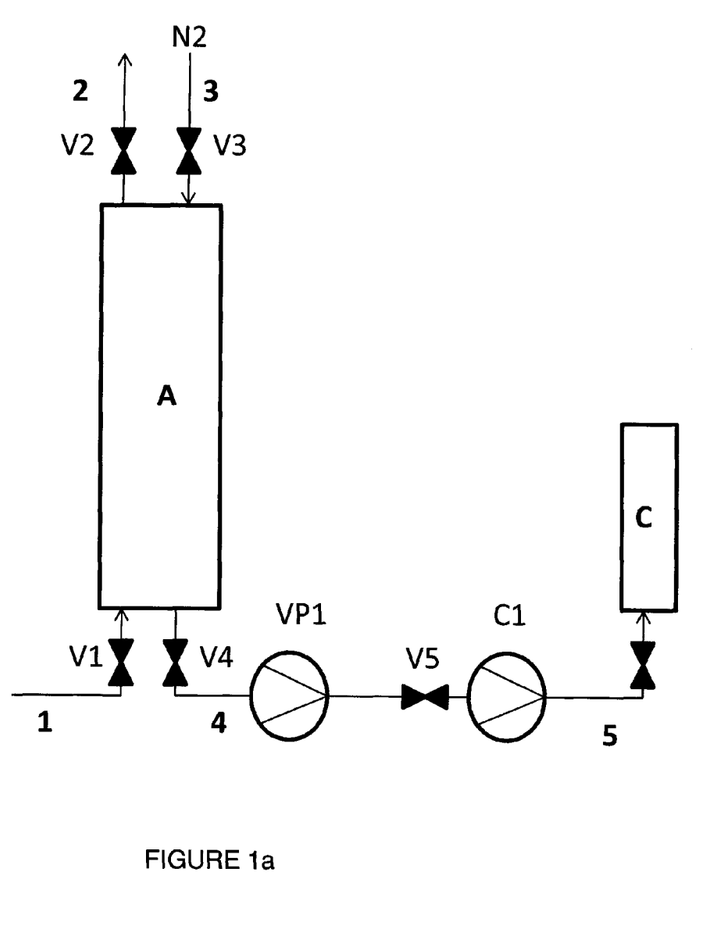
FIG. 1a (prior art) is a schematic view of an apparatus of a standard vacuum swing adsorption (VSA) process to recover xenon.
Figure 1B:
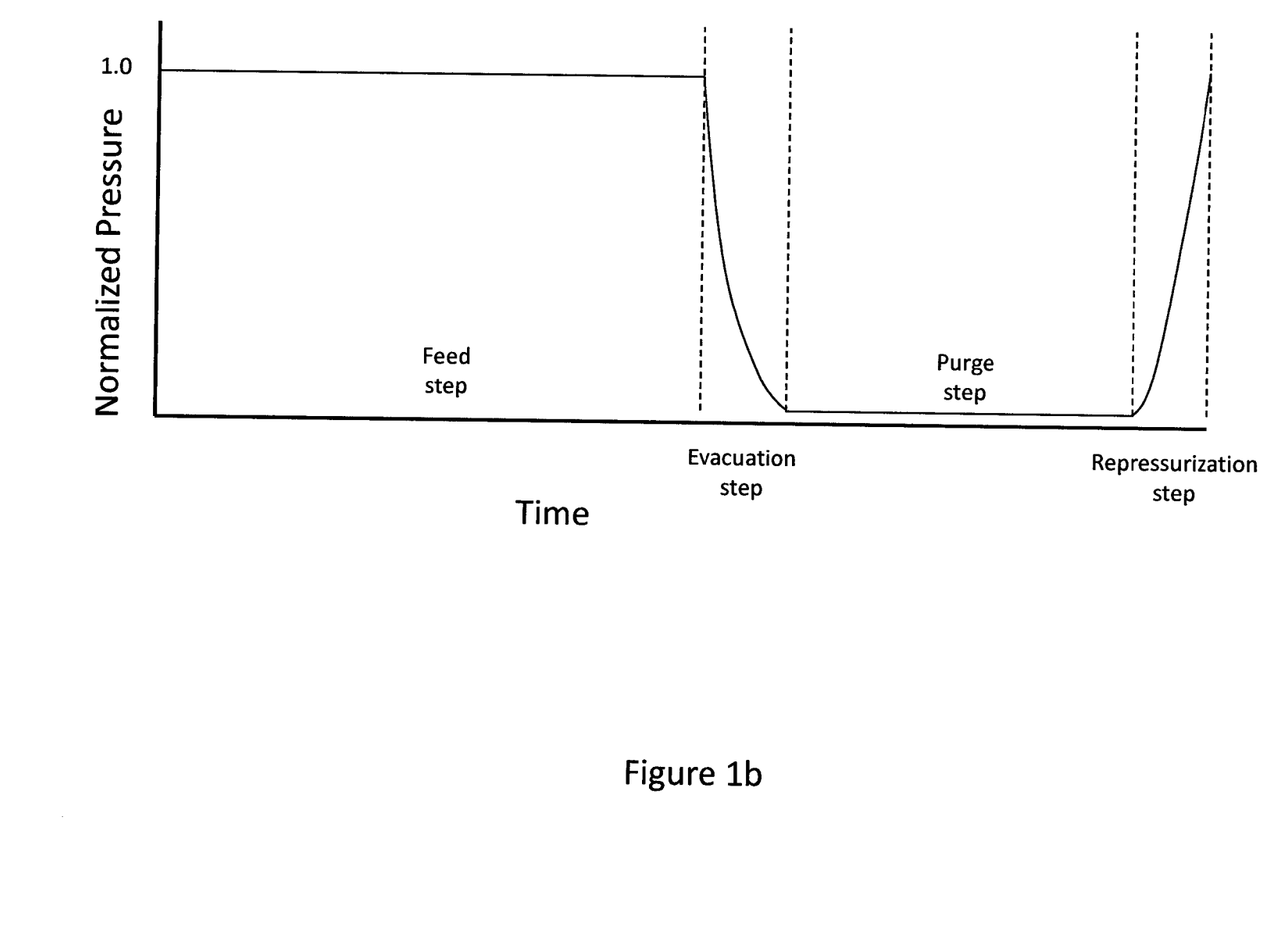
FIG. 1b (prior art) is an illustration of epected gas pressure inside an adsorption vessel A during execution of the prior art VSA process cycle.

FIG. 1a shows a standard vacuum swing adsorption (VSA) process to recover xenon. The process has four steps: feed, evacuation, purge, and repressurization. FIG. 1b illustrates the gas pressure maintained in adsorption vessel A during the standard VSA process.

The adsorption vessel A contains an adsorbent. The adsorbent has a capacity (Henry's Law constant) of at least 50 mmol/g/atm and a Xe/N2 selectivity less than 65. Suitable adsorbents include alumina, zeolite, silica gel, or activated carbon.

During the feed step, valves V1 and V2 are open. A nitrogen-rich, xenon-containing feed gas flows through line 1 to an adsorption vessel A. Xenon in the feed gas is preferentially adsorbed by the adsorbent contained in the adsorption vessel A, while $N_2$ gas passes through the adsorption vessel A and is vented through line 2. The gas pressure in the vessel is maintained at the desired feed pressure.

The nitrogen-rich, xenon-containing feed gas is fed to the adsorption vessel A until xenon breakthrough occurs; i.e., Xe is present in the vented $N_2$ exiting through line 2.

At breakthrough, the nitrogen-rich, xenon-containing feed gas flow through the adsorption vessel A is stopped by closing valves V1 and V2, and the evacuation step begins.

During the evacuation step, valves V4 and V5 are opened and the adsorption vessel A is evacuated to a final evacuation pressure (typically less than −1 atmospheric pressure) using a vacuum pump VP1. During evacuation, a xenon-enriched gas passes through line 4, the vacuum pump VP1 and is then compressed into a collection or product vessel C through line 5 using a compressor C1.

In the purge step, valve 3 is opened and the adsorption vessel A is purged by a purge gas through line 3 to desorb xenon. A xenon-enriched gas is withdrawn from the adsorption vessel A through line 4. The purge step provides a xenon-enriched gas which is combined with the xenon-enriched gas from the evacuation step. The purge step is conducted at a subatmospheric purge pressure and continues for a pre-determined time period. The purge gas is typically nitrogen.

The xenon-enriched gas from the vacuum pump VP1, consisting of gas from the evacuation and purge steps, is then compressed into a collection or product vessel C through line 5 using a compressor C1.

Following the purge step, valve V4 is closed, valve V3 is opened, and the adsorption vessel A is repressurized to the feed pressure using $N_2$ through line 3. Once the adsorption vessel A is repressurized, the adsorption feed step begins again through line 1, and the process described above is repeated.

The VSA consists of at least two identical adsorption vessels, A and B, which are operated so that one vessel is undergoing the feed step while the other is undergoing one of evacuation, purge, or repressurization steps.

WORKING EXAMPLES

Example 1 (Comparative)

Xenon Recover by a Typical Vacuum Swing Adsorption (VSA) Process

Figure 2:
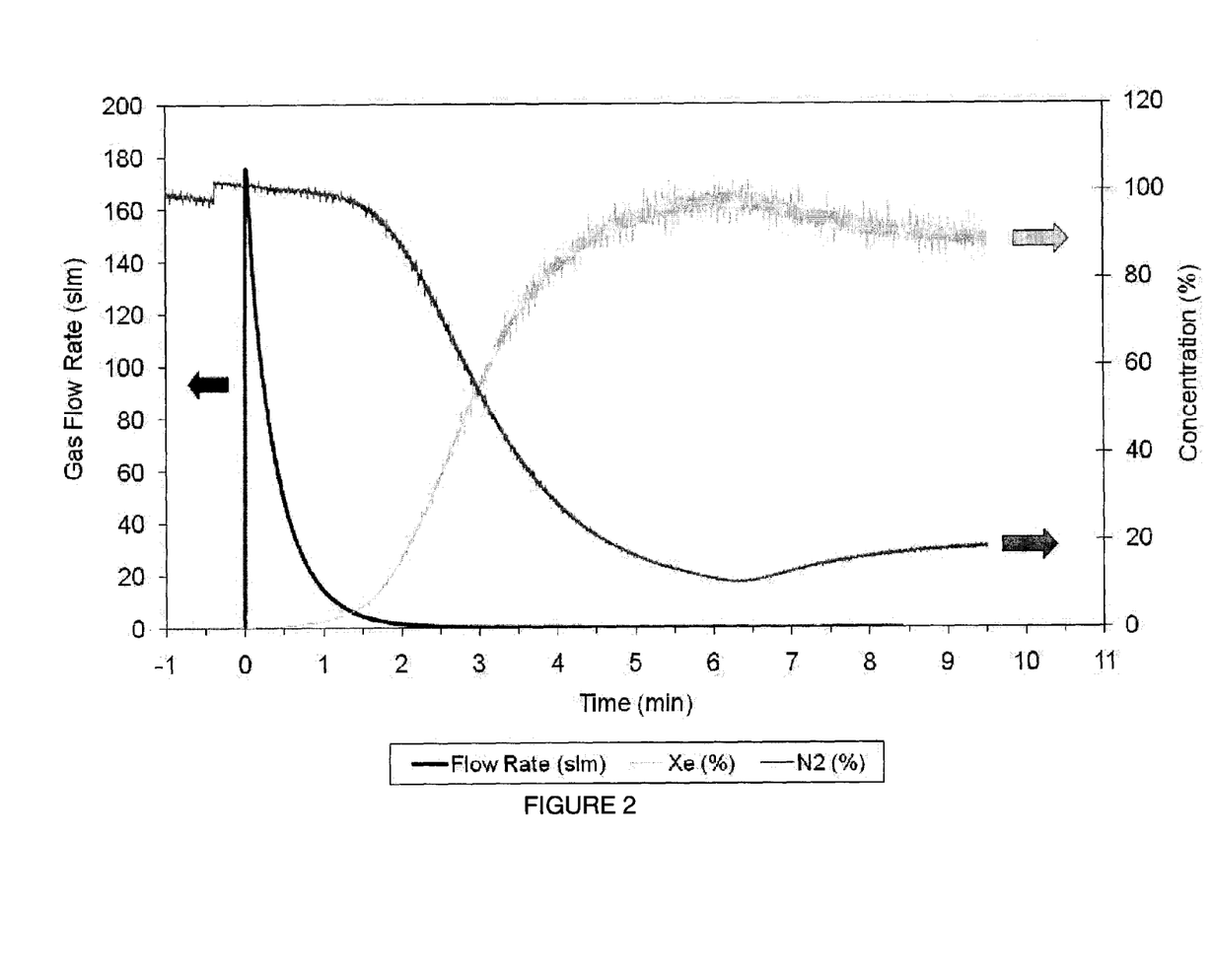
FIG. 2 is a graph showing the total gas flow rate and Xenon concentration during the purge step of the recovering process shown in FIG. 1a and FIG. 1b.

The total gas flow rate and xenon concentration measured at the exit of vacuum pump VP1 in FIG. 1a were shown in FIG. 2.

Gas flow rate was measured using a Mass Flow Meter (MFM), while Xe concentration was measured using a quadrupole mass spectrometer (QMS). The QMS is capable of estimating dynamic xenon and nitrogen gas compositions, but the device is not particularly precise. Measured values of xenon and nitrogen mole fraction have uncertainty range of about 10-20%.

At time 0 minutes, the evacuation step started by closing valves V1 and V2 then starting the vacuum pump VP1 and opening valve V4 in FIG. 1a. There was an instantaneous gas flow rate of >180 slm as the $N_2$ contained in the adsorbent vessel and void space was evacuated. It took about 2 to 3 minutes for the pressure in the adsorbent vessel A to drop from atmospheric pressure to <10 torr.

As shown in FIG. 2, the composition of the gas effluent was almost completely $N_2$ during the first 1-2 minutes; i.e., the $N_2$ concentration was >95% and very little xenon was detected. It was only after vessel A had been evacuated and the gas flow rate drops to <5 slm that any significant xenon was detected in the vacuum pump VP1.

After 2 minutes, significant xenon was detected by the QMS as it was desorbed from the adsorbent in the adsorption vessel A.

Once the pressure of vessel A was <3 torr (after ~2 minutes), the $N_2$ purge step was started by opening valve V4 and introducing 150 sccm $N_2$ through line 3.

Over the period 2-6 minutes in the purge step, the amount of Xenon increased until its concentration approaches 100%. The desorbed Xenon diluted the $N_2$ purge gas such that the $N_2$ concentration drops to <10%; i.e., most of the pump effluent was xenon.

Figure 3:
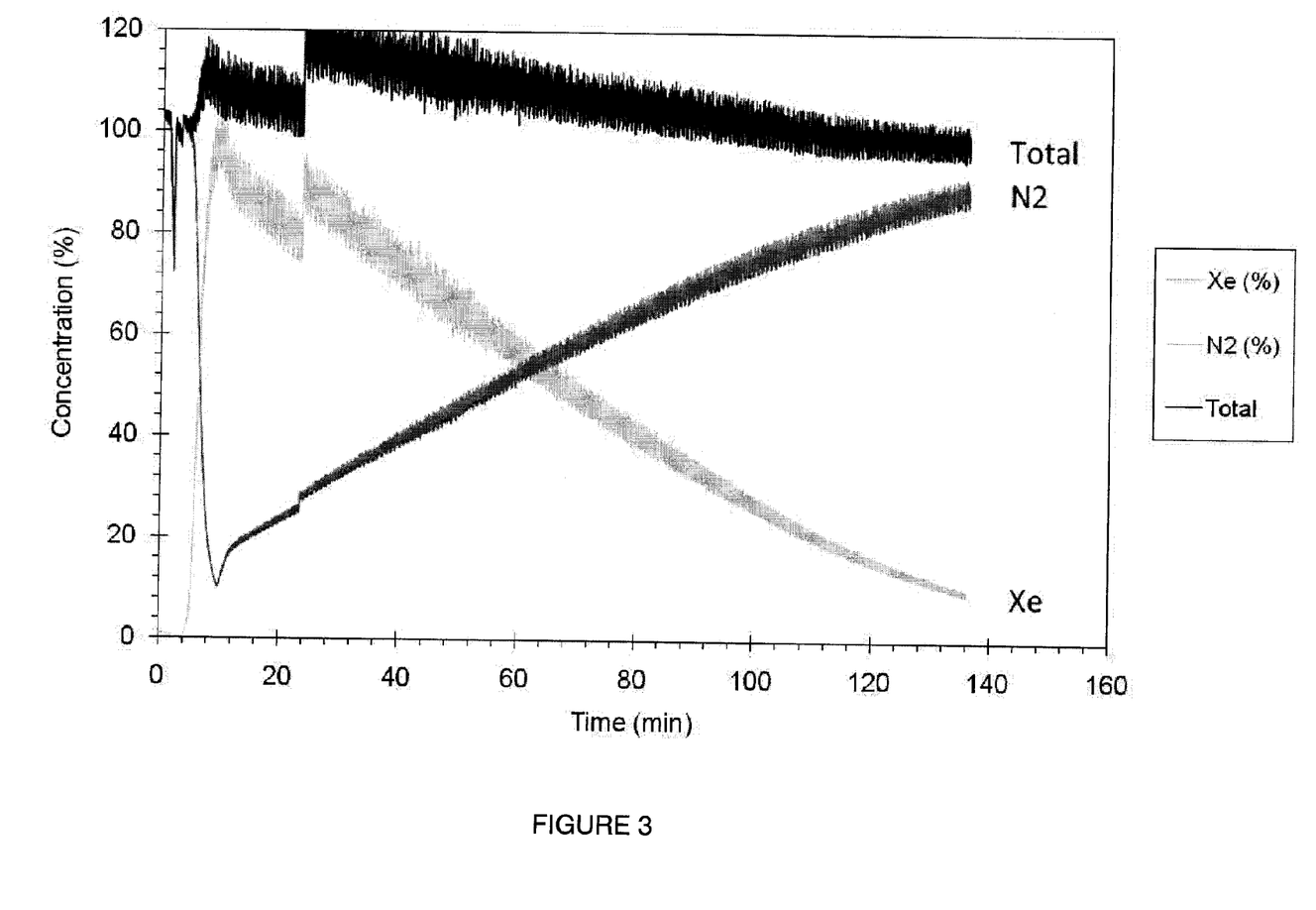
FIG. 3 is a graph showing the concentration profile for the purge step of the recovering process shown in FIG. 1a and FIG. 1b.

The concentration profile for the entire purge step was shown in FIG. 3.

Over a period of 130 minutes in the purge step, the Xenon concentration dropped from >90% to <10%.

During the purge step, the rate of Xenon desorption dropped as Xenon was removed from the adsorbent. As the Xenon flow rate decreased, the N2 flow rate remained essentially constant so the N2 concentration subsequently increased to >90%. Note that the sum of Xe and N2 concentrations was 100% throughout the purge step (within the limits of accuracy of the QMS analyzer).

Throughout the purge step, the $N_2$ flow rate (through lines 3 and 4) was 150 sccm. The flow rate of the Xe diluent could be calculated from the measured $N_2$ concentration in FIG. 3.

Figure 4:
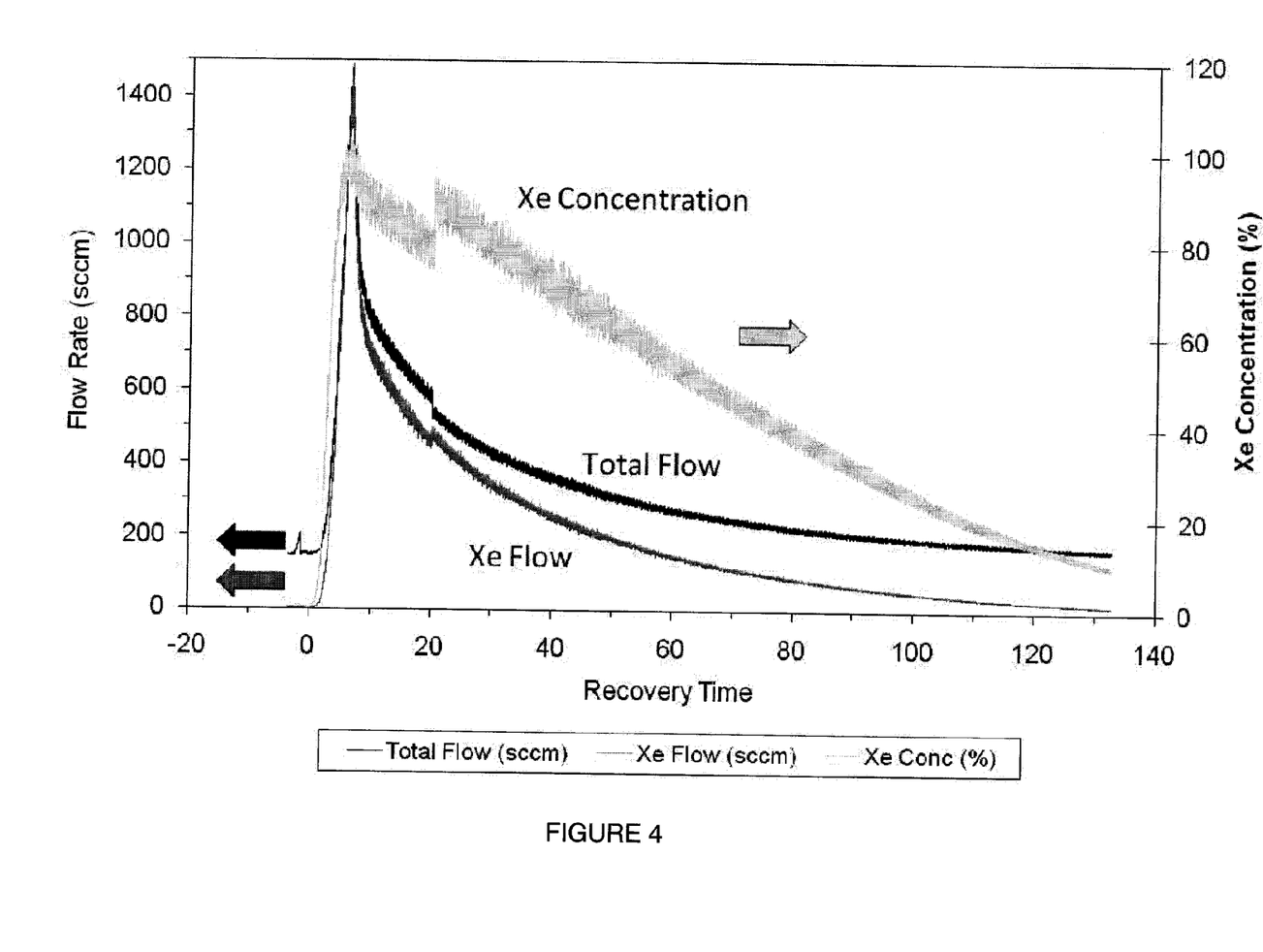
FIG. 4 is a graph showing the Xenon flow rate over the course of the purge step of the recovering process shown in FIG. 1a and FIG. 1b.

The Xenon flow rate over the course of the purge step was shown in FIG. 4. The Xenon flow rate decreased from 1400 sccm to <50 sccm.

Once a majority of the Xenon was removed from the adsorbent, the purge step was ended and the repressurization step commenced.

Example 2

Xenon Recover by an Improved Vacuum Swing Adsorption (VSA) Process

It was discovered from analysis of the data in FIG. 2 that Xe could be recovered from the VSA process at significantly higher purity by collecting the Xe after the initial evacuation of $N_2$ from the vessel void space.

Figure 5A:
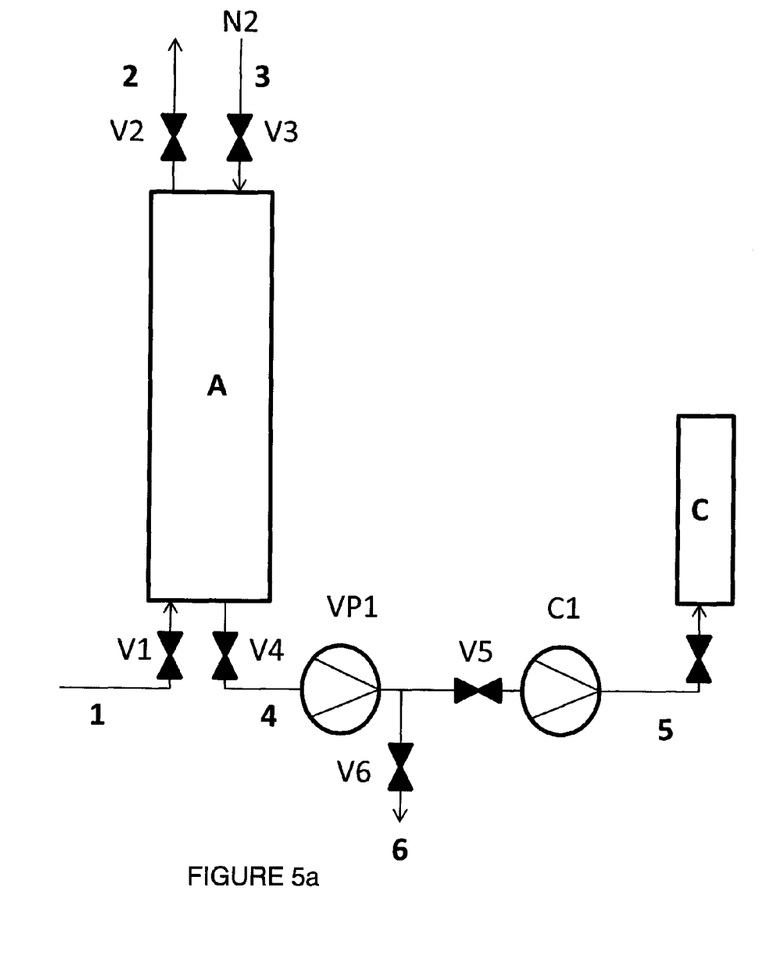
FIG. 5a is a schematic view of one embodiment of an improved vacuum swing adsorption (VSA) process to recover xenon.

An improved Vacuum Swing Adsorption (VSA) recovery process is shown in FIG. 5a. The process still has four steps: feed, evacuation, purge, and repressurization.

Figure 5B:
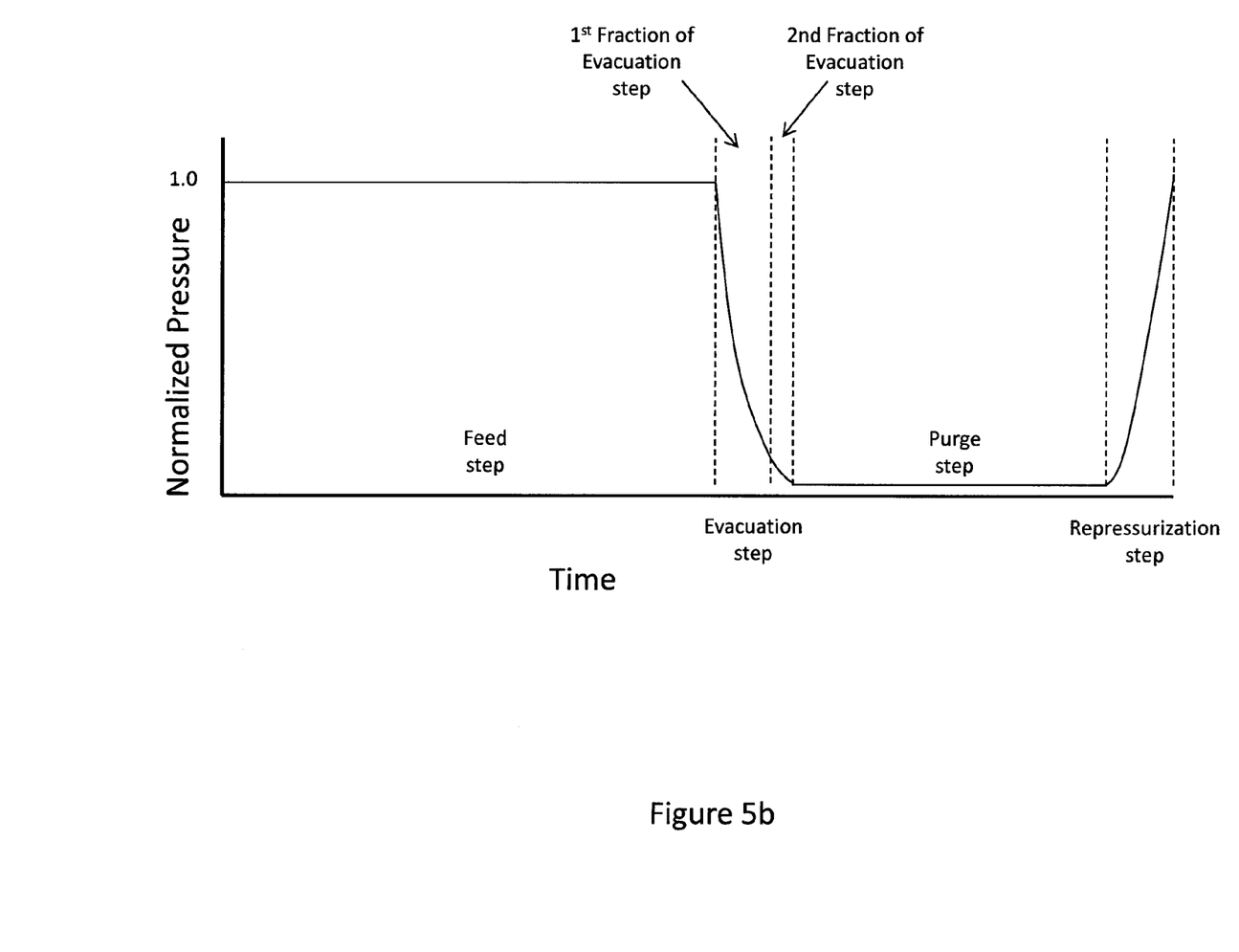
FIG. 5b is an illustration of epected gas pressure inside and adsorption vessel A during execution of the improved VSA process cycle.
Figure 6:
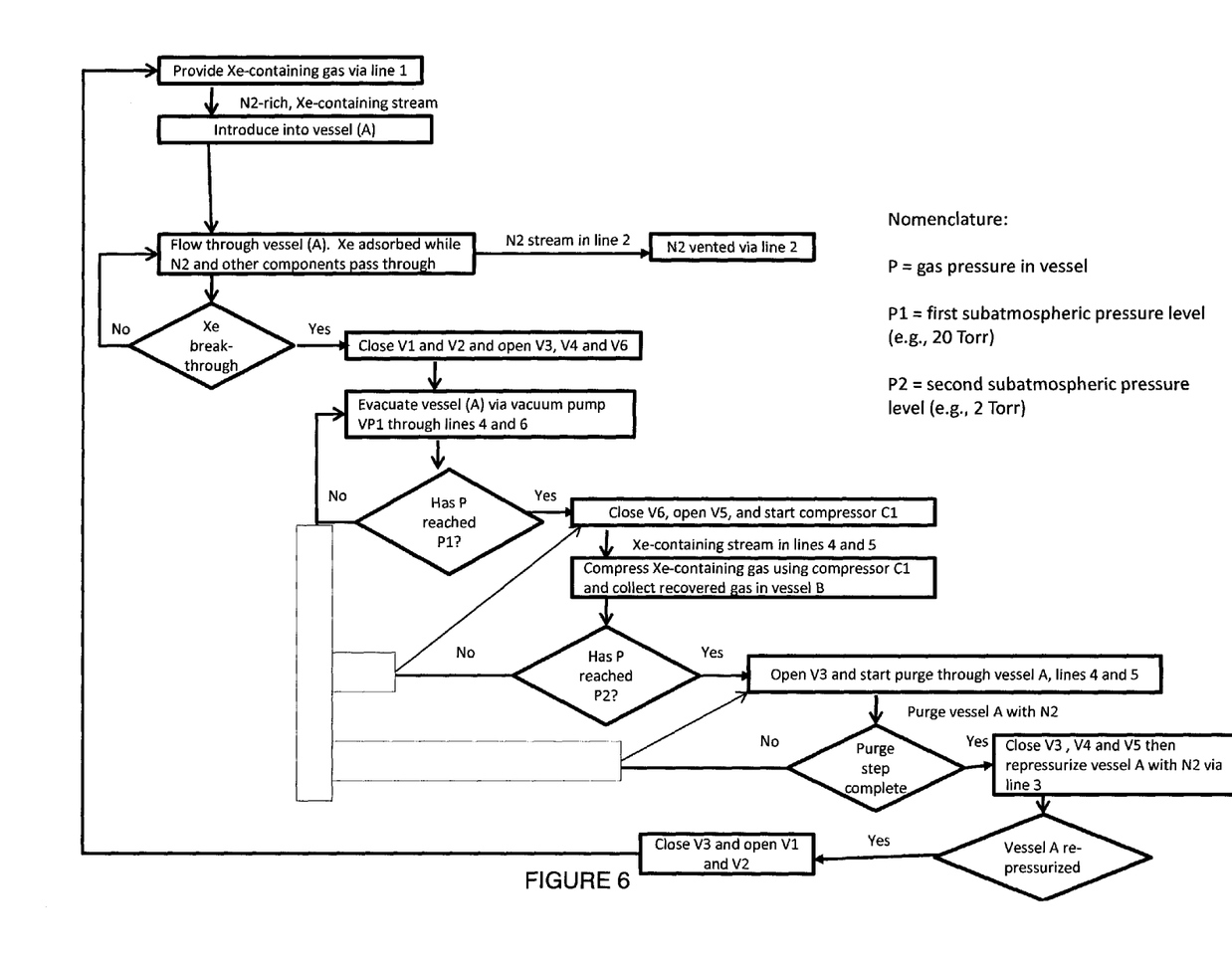
FIG. 6 is a flow chart of one embodiment of the improved vacuum swing adsorption process of the invention shown in FIG. 5a and FIG. 5b.

FIG. 5b illustrates the gas pressure maintained in adsorption vessel A during the improved VSA recovery process.

Figure 7:
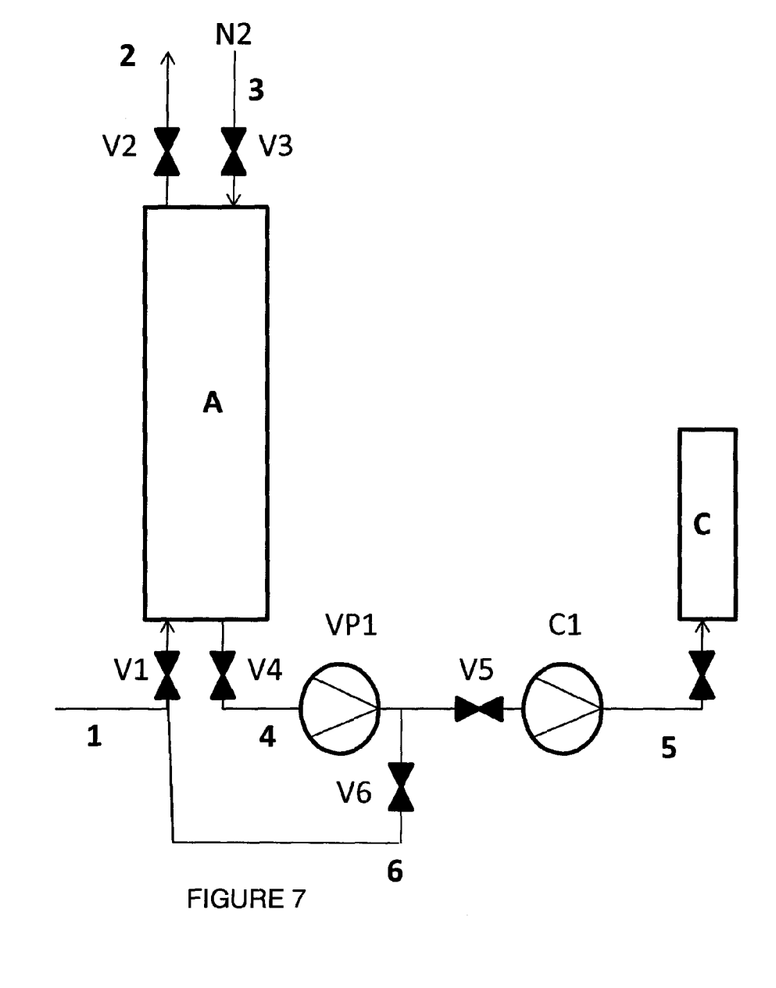
FIG. 7 is a schematic view of another embodiment of an improved vacuum swing adsorption process to recover xenon.

The flow chart showing the detailed steps of the improved Vacuum Swing Adsorption (VSA) recovery process is shown in FIG. 7.

The feed step is unchanged from the typical VSA recovery process.

During the evacuation-step, however, the adsorption vessel A is evacuated by vacuum pump VP1 through lines 4 and 6 to a first subatmospheric pressure P1 at which Xenon begins to appreciably desorb. This portion of the evacuation step is referred to as the first fraction of the evacuation step. During this step, $N_2$ in the vessel void-volume is vented rather than collected in the collection or production vessel C.

During the second fraction of the evacuation step, the bed pressure continues to fall below the first subatmospheric pressure P1, xenon starts desorbing, valve V6 is closed and valve V5 is opened to collect the Xe-containing gas. Compressor C1 compresses the Xe-containing gas mixture into the collection or product vessel C through line 5.

The range of P1 is from 100 to 1 torr, preferred range is from 50 to 5 torr, and most preferred range is from 25 to 5 torr.

Once a second subatmospheric pressure P2 has been achieved in the adsorption vessel A, the purge step is started by opening valve V3 and flowing $N_2$ through the adsorption vessel A, lines 4 and 5, and into the collection or product vessel C. The adsorption vessel A is purged with $N_2$ for a predetermined time. The gas pressure is maintained at the subatmospheric pressure P2 during this step. Xenon is desorbed from the adsorption vessel A and is collected in the collection or product vessel C.

The range of P2 is from 10 to 0.001 torr, preferred range is from 5 to 0.01 torr, and most preferred range is from 3 to 0.5 torr.

Once the purge step is complete, valves V4 and V5 are closed and the repressurization step starts by flowing $N_2$ into the adsorption vessel A through line 3.

Once vessel A is repressurized, the feed step is recommenced by closing valve V3 and opening valves V1 and V2.

The composition of the gas mixture collected in vessel C was measured by QMS: Xe (29%), $N_2$ (68%). This Xenon concentration is 2.5 times higher than that had the $N_2$ contained in the vessel void-space been collected instead of vented, as in Example 1.

The benefit of higher Xenon concentration is that the total volume of gas collected during Xenon recovery is reduced proportionately. Additionally, a smaller compressor C1 can be used since the peak gas flow rate is reduced.

We have found that Xenon appreciably desorbs only during the second fraction of the evacuation step. During the first fraction of the evacuation step (e.g., from 1 atmospheric pressure to <100 torr) there is little Xe desorption. Gas collected during this time consists essentially of $N_2$ and simply dilutes the recovered Xe in the collection or product vessel C. By only collecting the recovered gas mixture after the adsorption Vessel A has been evacuated to the first subatmoshperic pressure (e.g., ~100-1 torr), the recovered Xe is not diluted by $N_2$ contained in the adsorbent vessel and void space, and simultaneously little Xenon is lost. The concentration of the recovered Xe can by increased by simply venting the effluent gas during the first fraction of evacuation step.

The improved VSA consists of at least two identical adsorption vessels, A and B, which are operated so that one vessel is undergoing the feed step while the other is undergoing one of evacuation, purge, or repressurization steps.

Example 3

Xenon Recover by an Improved Vacuum Swing Adsorption (VSA) Process with Recycle

A further improvement of the VSA recovery process is shown in FIG. 7. The process still has four steps: feed, evacuation, purge, and repressurization.

Figure 8:
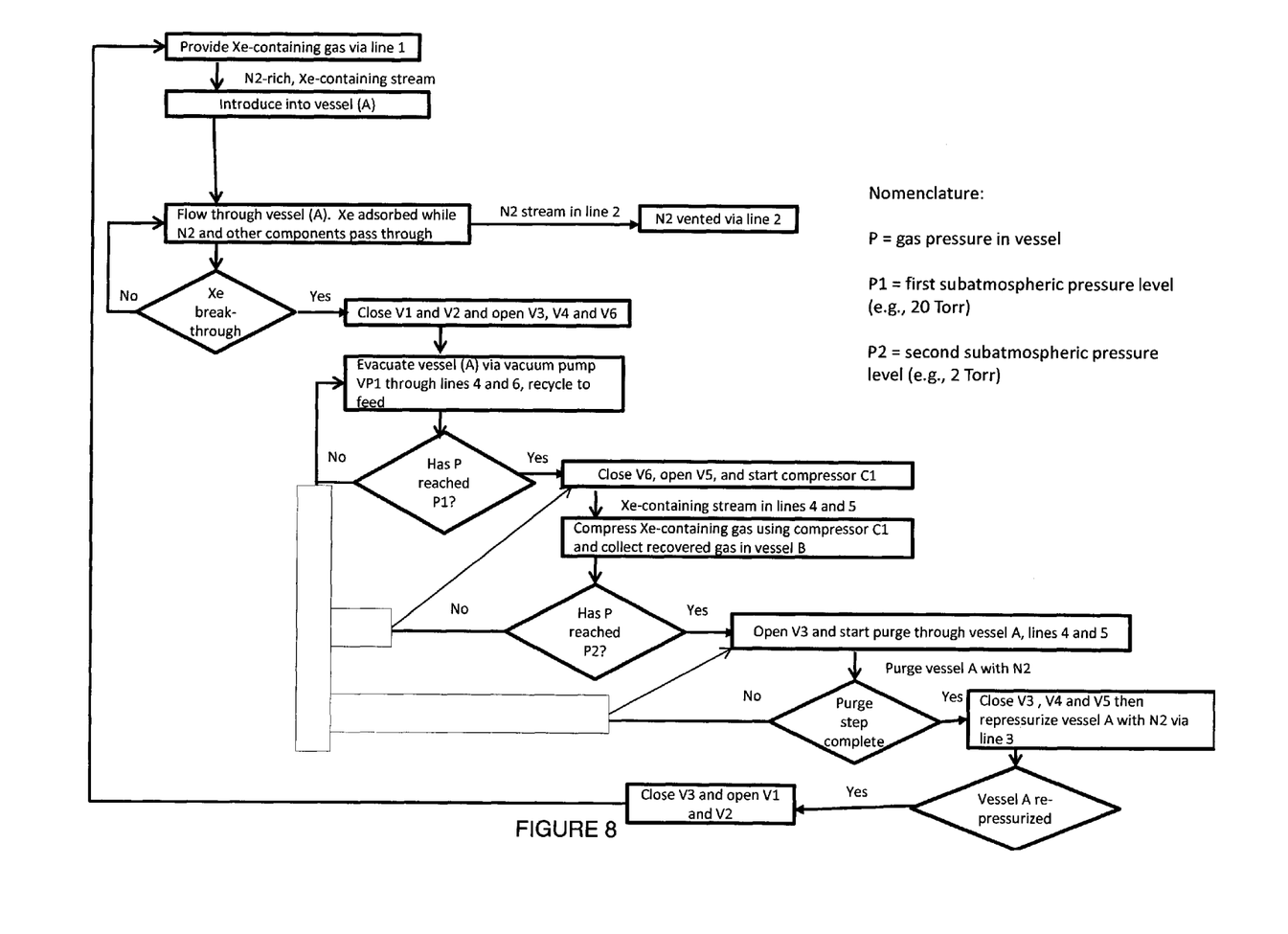
FIG. 8 is a flow chart of another embodiment of the improved vacuum swing adsorption process of the invention shown in FIG. 7.

The flow chart showing the detailed steps of the improved Vacuum Swing Adsorption (VSA) recovery process is shown in FIG. 8.

The pressure history illustrated in FIG. 5b is also applicable to this case.

The feed step is conducted by mixing the fresh Xe-containing feed gas with a recycle gas produced in the next step. The combined feed gas is fed to the VSA recovery process until Xe breakthrough occurs. At breakthrough, the combined feed gas flow through the adsorption vessel A is stopped by closing valves V1 and V2, and the evacuation step begins.

During the evacuation-step, the adsorption vessel A is evacuated by vacuum pump VP1 through lines 4 and 6 to a first subatmospheric pressure P1. This is referred to as the first fraction of the evacuation step. The first subatmospheric pressure P1 could be that at which Xenon begins to appreciably desorb; or it could be a lower pressure at which significant amounts of Xe desorb. The gas that is exhausted from the vacuum pump during this step is passed through valve 6 and recycled to the feed stream.

The range of P1 is from 100 to 1 torr, preferred range is from 50 to 5 torr, and most preferred range is from 25 to 5 torr.

During the second fraction of the evacuation step, substantial amounts of xenon start desorbing, valve V6 is closed and valve V5 is opened to collect the Xe-containing gas. Compressor C1 compresses the Xe-containing gas mixture into the collection or product vessel C through line 5.

Once a second subatmospheric pressure P2 has been achieved in the adsorption vessel A, the purge step is started by opening valve V3 and flowing $N_2$ through the adsorption vessel A, lines 4 and 5, and into the collection or product vessel C.

The range of P2 is from 10 to 0.001 torr, preferred range is from 5 to 0.01 torr, and most preferred range is from 3 to 0.5 torr.

The first subatmospheric pressure P1 must be equal to or greater than the second subatmospheric pressure P2 that initiates the purge step.

The adsorption Vessel A is purged with $N_2$, Xenon is desorbed from the adsorption vessel A and is collected in the collection or product vessel C.

Once the purge step is complete, valves V4 and V5 are closed and the repressurization step starts by flowing $N_2$ into the adsorption vessel A through line 3.

Once vessel A is repressurized, the feed step is recommenced by closing valve V3 and opening valves V1 and V2.

The improved VSA consists of at least two identical adsorption vessels, A and B, which are operated so that one vessel is undergoing the feed step while the other is undergoing one of evacuation, purge, or repressurization steps.

A vessel may be used to effectively capture the recycled gas from the evacuation step and mix it with the fresh feed gas. The vessel could be a constant volume, variable pressure system or a constant pressure, variable volume system.

Simulation Examples

In the next set of examples, simulations were conducted with our internal adsorption process modeling software to evaluate the performance of various VSA process cycles. The software effectively solves the dynamic mass, momentum, and energy balance equations for a fixed bed adsorber during the various steps (e.g., feed, evac, purge, repress) for a given cycle. A cyclic steady state condition is achieved by simulating many repetitions of the same cycle—at cyclic steady state the dynamic pressure, composition, flow, and temperature profiles in the bed are identical for subsequent cycles. At this point process performance can be evaluated via analysis of the inlet and effluent gas streams from the adsorber.

In these examples we determined the Xe recovery (Xe in the recovered gas divided by Xe in the raw feed gas) and average Xe purity in the recovered gas. In all cases a two-bed VSA was considered. Each bed was 10" in diameter by 46" in length, and packed with activated carbon (Calgon AP245). The raw feed gas consisted of 1600 ppm Xe in N2 at 68 F, 1.2 atm. The feed flow to the vessel was adjusted so only 5 ppm of Xe broke through the vessel during the feed step. Pressure in the vessel was maintained at 1 atm during feed and 2 Torr (0.0025 atm) during the purge step.

Example 4

Two-Bed VSA (Comparative)

In this case the process cycle consisted of feed, first fraction of evacuation (EVAC1) for 41 s to a bed pressure of 25 Torr, second fraction of evacuation (EVAC2) for an additional 54 s to a bed pressure of 2 Torr, purge for 1800 s with 2 slpm N2 and a bed pressure of 2 Torr, and finally repressurization to 1 atm with N2. The gas from EVAC1, EVAC2 and the purge step were taken as product, while all other streams were rejected to waste.

Results are in Table 1. This prior art VSA system could recover 99.7% of the Xe in the feed gas, but at a very low purity of 2.4%. The concentration factor was 2.4/0.16=15.

TABLE 1

Simulation Results.

| | P/F | EVAC1/ (EVAC1 + EVAC2) | Xe recovery (%) | Recovered Xe purity (%) | feed rate (slpm) | feed time (min) |
|---|---|---|---|---|---|---|
| Example 4. prior art case—EVAC1, EVAC2, purge all recovered as product | 1.64 | na | 99.7 | 2.4 | 135 | 45 |

TABLE 1-continued

Simulation Results.

| | P/F | EVAC1/ (EVAC1 + EVAC2) | Xe recovery (%) | Recovered Xe purity (%) | feed rate (slpm) | feed time (min) |
|---|---|---|---|---|---|---|
| Example 5—EVAC1 vented; EVAC2, purge recovered as product | 1.64 | 0.43 | 87.5 | 10.0 | 135 | 45 |
| Example 6—EVAC1 recycled; EVAC2, purge recovered as product | 1.66 | 0.43 | 99.7 | 10.5 | 135 | 42.5 |
| Example 7—EVAC1 recycled; EVAC2, purge recovered as product - extended EVAC1 | 1.67 | 0.86 | 99.7 | 12.8 | 135 | 42 |

Example 5

Two-Bed VSA with EVAC1 to Vent

This process cycle was identical to that in Example 4, except the effluent gas in step EVAC1 was sent to vent rather than combined with EVAC2 and the purge effluent. This resulted in an improved process which could produce a recovered stream containing 10.0% Xe with 87.5% Xe recovery. The concentration factor was 10.0/0.16=63.

For a fixed evacuation step duration (=EVAC1 step duration+EVAC2 step duration) higher Xe purity in the recovered product was possible by extending the duration of the EVAC1 step, at the expense of reduced Xe recovery. Likewise, the Xe recovery could be increased by decreasing the duration of the EVAC1 step, at the expense of reduced Xe purity.

Example 6

Two bed VSA with EVAC1 Recycle

In this case the process cycle consisted of feed, first fraction of evacuation (EVAC1) for 41 s to a bed pressure of 25 Torr, second fraction of evacuation (EVAC2) for an additional 54 s to a bed pressure of 2 Torr, purged for 1800 s with 2 slpm N2 and a bed pressure of 2 Torr, and finally repressurization to 1 atm with N2. The gas from the EVAC1 step was combined with fresh feed gas and the combined stream was fed to the VSA during the feed step, Effluent from the EVAC2 and the purge step were taken as product.

Results were in Table 1. This approach greatly improved VSA performance to 99.7% Xe recovery and recoverd Xe purity of 10.5%. This approach yielded both high Xe recovery and purity.

The feed step time was reduced slightly to maintain a 5 ppm Xe level in the light product gas.

Example 7

Two Bed VSA with Extended EVAC1 Recycle

In this case the process cycle consisted of feed, first fraction of evacuation (EVAC1) for 82 s to a bed pressure of 3 Torr, second fraction of evacuation (EVAC2) for an additional 13 s to a bed pressure of 2 Torr, purge for 1800 s with 2 slpm N2 and a bed pressure of 2 Torr, and finally repressurization to 1 atm with N2. Effectively, the EVAC1 step time was doubled over Example 6, while the overall duration of evacuation (EVAC1 step duration+EVAC2 step duration) was kept the same. The gas from the EVAC1 step was combined with fresh feed gas and the combined stream was fed to the VSA during the feed step, Effluent from the EVAC2 and the purge step were taken as product.

Results were in Table 1. This approach greatly improved VSA performance to 99.7% Xe recovery and recovered Xe purity of 12.8%. Increasing the EVAC1 step duration increased the purity of the recovered Xe with little impact on Xe recovery.

The feed step time was reduced slightly to maintain a 5 ppm Xe level in the light product gas.

The foregoing examples and description of the embodiments should be taken as illustrating, rather than as limiting the present invention as defined by the claims. As will be readily appreciated, numerous variations and combinations of the features set forth above can be utilized without departing from the present invention as set forth in the claims. Such variations are intended to be included within the scope of the following claims.

The invention claimed is:

1. A process of recovering xenon from a Xe-containing feed gas, comprising the steps of:
   providing an adsorption vessel containing an adsorbent having a $Xe/N_2$ selectivity ratio of less than 65;
   feeding the Xe-containing feed gas into the adsorption vessel, wherein the Xe-containing feed gas comprises an initial concentration of nitrogen greater than 50% and an initial concentration of xenon of at least 0.05%;
   evacuating the adsorption vessel by reducing pressure from atmospheric pressure to below atmospheric pressure, wherein the evacuating contains two parts: (1) evacuating a first part of gas, and (2) recovering a first xenon-enriched gas when the below atmospheric pressure reaches P1;
   purging the adsorption vessel when the below atmospheric pressure reaching P2 to recover a second xenon-enriched gas, wherein the purging is maintained at the subatmospheric pressure P2; and
   combining the first xenon-enriched gas and the second xenon-enriched gas to provide a product gas comprising a final concentration of xenon at least 20 times greater than the initial concentration of xenon;
   wherein P1 is equal to or greater than P2.

2. The process of claim 1, further comprising repressurizing the adsorption vessel after the purging step and repeating the steps of the process at least once.

3. The process of claim 1, wherein the Xe-containing feed gas comprises an effluent gas of a semiconductor-related manufacturing process.

4. The process of claim 3, wherein the effluent gas comprises Xe and at least one member selected from the group consisting of HF, $F_2$, $H_2O$, $C_4F_6$, $O_2$, $CO_2$, $COF_2$, $XeF_2$, $CF_4$ and $SiF_4$, is passed through a surge vessel to adsorb at least one of $H_2O$, $CO_2$, and fluorinated molecules from the effluent gas, and is diluted with $N_2$ to provide the feed gas for feeding into the adsorption apparatus.

5. The process of claim 1, wherein the initial concentration of xenon is 0.1% to 5.0%.

6. The process of claim 1, wherein P1 is from 100 to 1 torr, and P2 is from 10 to 0.001 torr.

7. The process of claim 1, wherein P1 is from 50 to 5 torr, and P2 is from 5 to 0.01 torr.

8. The process of claim 1, wherein P1 is from 25 to 5 torr, and P2 is from 3 to 0.5 torr.

9. The process of claim 1, wherein the adsorbent comprises at least one member selected from the group consisting of an alumina, a zeolite, a silica gel and an activated carbon.

10. The process of claim 1, wherein the adsorbent consists essentially of particles having a diameter of 0.5 to 3.0 mm.

11. The process of claim 1, wherein a xenon recovery rate is at least 80%.

12. The process of claim 1, wherein the process is conducted in a vacuum swing adsorption apparatus containing at least one adsorption vessel.

13. The process of claim 1, wherein the evacuating the first part of gas is venting the first part of gas.

14. The process of claim 1, wherein the evacuating the first part of gas is recycling the first part of gas into the feeding step.

15. A process of recovering xenon from a Xe-containing feed gas, comprising the steps of:
   providing an adsorption vessel containing an adsorbent having a $Xe/N_2$ selectivity ratio of less than 65;
   feeding the Xe-containing feed gas into the adsorption vessel, wherein the Xe-containing feed gas comprises an initial concentration of nitrogen greater than 50% and an initial concentration of xenon of at least 0.05%;
   evacuating the adsorption vessel by reducing pressure from atmospheric pressure to below atmospheric pressure, wherein the evacuating contains two parts: (1) recycling a first part of gas into the feeding step, and (2) recovering a first xenon-enriched gas when the below atmospheric pressure reaches P1;
   purging the adsorption vessel when the below atmospheric pressure reaching P2 to recover a second xenon-enriched gas, wherein the purging is maintained at the subatmospheric pressure P2; and
   combining the first xenon-enriched gas and the second xenon-enriched gas to provide a product gas comprising a final concentration of xenon at least 20 times greater than the initial concentration of xenon;
   wherein P1 is equal to or greater than P2.

16. The process of claim 15, further comprising repressurizing the adsorption vessel after the purging step and repeating the steps of the process at least once.

17. The process of claim 15, wherein the Xe-containing feed gas comprises an effluent gas of a semiconductor-related manufacturing process; and the effluent gas comprises Xe and at least one member selected from the group consisting of HF, $F_2$, $H_2O$, $C_4F_6$, $O_2$, $CO_2$, $COF_2$, $XeF_2$, $CF_4$ and $SiF_4$, is passed through a surge vessel to adsorb at least one of $H_2O$, $CO_2$, and fluorinated molecules from the effluent gas, and is diluted with $N_2$ to provide the feed gas for feeding into the adsorption apparatus.

18. The process of claim 15, wherein the initial concentration of xenon is 0.1% to 5.0%, the adsorbent comprises at least one member selected from the group consisting of an alumina, a zeolite, a silica gel and an activated carbon, P1 is from 100 to 1 torr, and P2 is from 10 to 0.001 torr, and the process is conducted in a vacuum swing adsorption apparatus containing at least one adsorption vessel.

\* \* \* \* \*